United States Statutory Invention Registration [19]

[11] Reg. Number: H578

Behl et al. [43] Published: Feb. 7, 1989

[54] ELECTROLYTE ADDITIVE FOR LITHIUM RECHARGEABLE ORGANIC ELECTROLYTE BATTERY

[75] Inventors: Wishvender K. Behl, Ocean, N.J.; Der-Tau Chin, Winthrop, N.Y.

[73] Assignee: The United States of America as represented by the Secretary of the Army, Washington, D.C.

[21] Appl. No.: 153,611

[22] Filed: Feb. 8, 1988

[51] Int. Cl.[4] ..... H01M 10/08
[52] U.S. Cl. ..... 429/197; 429/218
[58] Field of Search ..... 429/194, 197

[56] References Cited

U.S. PATENT DOCUMENTS 4,228,227 10/1980 Saathoff et al. ..... 429/194

*Primary Examiner*—John F. Terapane
*Assistant Examiner*—Susan Wolffe
*Attorney, Agent, or Firm*—Sheldon Kanars; Roy E. Gordon

[57] ABSTRACT

A large excess of lithium iodide in solution is used as an electrolyte additive to provide overcharge protection for a lithium rechargeable organic electrolyte battery.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROLYTE ADDITIVE FOR LITHIUM RECHARGEABLE ORGANIC ELECTROLYTE BATTERY

The invention described herein may be manufactured, used, and licensed by or for the Government for governmental purposes without the payment to us of any royalty thereon.

The invention relates in general to a rechargeable lithium organic electrolyte battery and in particular to an electrolyte additive for such a battery that provides overcharge protection.

BACKGROUND OF THE INVENTION

Rechargeable lithium-organic electrolyte batteries are being developed to provide low cost, high energy density power sources for communication, night vision and various other army applications. Typically, a rechargeable lithium organic electrolyte battery includes a lithium anode, a cathode including compounds such as titanium disulfide, molybdenum oxide, molybdenum sulfide, vanadium oxide, vanadium sulfide, chromium oxide, etc and an electrolyte solution including an inorganic lithium salt such as lithium hexafluoroarsenate, lithium perchlorate, etc in organic solvents such as tetrahydrofuran, 2-methyl tetrahydrofuran, etc.

One of the common problems of most lithium organic electrolyte batteries is the oxidation of the solvent during the overcharging of these cells resulting in the degradation of electrolyte solutions. It has been suggested that the oxidation of organic solvents during the overcharging operation could be prevented by using lithium iodide as an electrolyte additive. Thus, during the overcharging operations, lithium iodide would be preferentially oxidized first to lithium tri-iodide and eventually to iodine at lower potentials than the solvent oxidation potential and thus would prevent the oxidation of the solvent. In laboratory experiments however, it was found that the liberated iodine itself reacted with the ethereal solvents such as tetrahydrofuran in the presence of lithium hexafluoroarsenate salt and caused its polymerization rendering this approach infeasible.

SUMMARY OF THE INVENTION

The general objective of this invention is to provide overcharge protection for a lithium rechargeable organic electrolyte battery. A more particular object of the invention is to effectively use an electrolyte additive to provide overcharge protection for such a battery.

It has now been found that the aforementioned objects can be attained using a large excess of lithium iodide in the concentration range of about 0.5 to 1.0 molar.

In the presence of excess lithium iodide, the liberated iodine complexes with lithium iodide to form lithium tri-iodide because of the high equilibrium constant of $10^7$ and thus does not react with the tetrahydrofuran solvent. Lithium tri-iodide is stable in these solutions and will react with lithium metal to regenerate lithium iodide that will then provide overcharge protection in the following cycles. The use of excess lithium iodide will thus provide overcharge protection in rechargeable lithium-organic electrolyte cells and increase the cycle life of these cells.

DESCRIPTION OF THE PREFERRED EMBODIMENT

In a typical cell configuration such as lithium/lithium hexafluoroarsenate-tetrahydrofuran/titanium disulfide, the organic electrolyte will contain a sufficient amount of lithium iodide additive so that during the overcharging operations all of the lithium iodide is not oxidized to iodine and there is always an excess of lithium iodide present in the solution to combine with the liberated iodine to form stable lithium tri-iodide. The solubility of lithium iodide in tetrahydrofuran solutions is in excess of 1.0 molar and thus enough of lithium iodide can be added to the electrolyte to satisfy the condition that there always be an excess of lithium iodide present to complex with any iodine formed during the overcharging operations. Further, lithium tri-iodide will react with lithium metal to regenerate lithium iodide and restore the cell to its original configuration and be available to provide overcharge protection during the following cycles.

The invention is also applicable to lithium-organic electrolyte primary cells. In fact, the invention is applicable to all ambient temperature lithium-organic electrolyte batteries.

We wish it to be understood that we do not desire to be limited to the exact details of construction shown and described for obvious modifications will occur to a person skilled in the art.

What is claimed is:

1. In a lithium rechargeable organic electrolyte battery including lithium as the anode, a compound selected from the group consisting of titanium disulfide, molybdenum oxide, molybdenum sulfide, vanadium oxide, vanadium sulfide, and chromium oxide as the cathode, and a solution of an organic lithium salt in an organic solvent as the electrolyte, the improvement of using a large excess of lithium iodide in the solution as an electrolyte additive to provide overcharge protection.

2. A lithium rechargeable organic electrolyte battery according to Claim 1 wherein the large excess of lithium iodide in the solutions is about 0.5 to 1.0 molar.

3. A lithium rechargeable organic electrolyte battery according to claim 2 wherein the cathode is titanium disulfide.

4. A lithium rechargeable organic electrolyte battery according to claim 2 wherein the cathode is molybdenum oxide.

5. A lithium rechargeable organic electrolyte battery according to claim 2 wherein the cathode is molybdenum sulfide.

6. A lithium rechargeable organic electrolyte battery according to claim 2 wherein the cathode is vanadium oxide.

7. A lithium rechargeable organic electrolyte battery according to claim 2 wherein the cathode is vanadium sulfide.

8. A lithium rechargeable organic electrolyte battery according to claim 2 wherein the cathode is chromium oxide.

9. A lithium rechargeable organic electrolyte battery according to claim 3 wherein the electrolyte is a solution of lithium hexafluoroarsenate in tetrahydrofuran.

10. A lithium rechargeable organic electrolyte battery according to claim 4 wherein the electrolyte is a solution of lithium hexafluoroarsenate in tetrahydrofuran.

11. A lithium rechargeable organic electrolyte battery according to claim 5 wherein the electrolyte is a solution of lithium 12. A lithium rechargeable organic electrolyte battery according to claim 6 wherein the electrolyte is a solution of lithium hexafluoroarsenate in tetrahydrofuran.

13. A lithium rechargeable organic electrolyte battery according to claim 7 wherein the electrolyte is a solution of lithium hexafluoroarsenate in tetrahydrofuran.

14. A lithium rechargeable organic electrolyte battery according to claim 8 wherein the electrolyte is a solution of lithium hexafluoroarsenate in tetrahydrofuran.

* * * * *